United States Patent
Rolette et al.

(10) Patent No.: US 9,935,883 B2
(45) Date of Patent: *Apr. 3, 2018

(54) DETERMINING A LOAD DISTRIBUTION FOR DATA UNITS AT A PACKET INSPECTION DEVICE

(71) Applicant: Trend Micro Incorporated, Tokyo (JP)

(72) Inventors: James M. Rolette, Round Rock, TX (US); Damon E. Fleury, Cedar Park, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,939

(22) Filed: Oct. 31, 2016

(65) Prior Publication Data
US 2017/0048149 A1     Feb. 16, 2017

Related U.S. Application Data (63) Continuation of application No. 14/428,038, filed as application No. PCT/US2012/055333 on Sep. 14, 2012, now Pat. No. 9,515,934.

(51) Int. Cl.
| | |
|---|---|
| *H04L 1/00* | (2006.01) |
| *H04L 12/803* | (2013.01) |
| *H04L 12/26* | (2006.01) |
| *H04L 29/06* | (2006.01) |

(52) U.S. Cl.
CPC .......... *H04L 47/125* (2013.01); *H04L 43/028* (2013.01); *H04L 43/0817* (2013.01); *H04L 43/0882* (2013.01); *H04L 43/12* (2013.01); *H04L 63/0245* (2013.01)

(58) Field of Classification Search
CPC . H04L 47/125; H04L 43/0817; H04L 43/028; H04L 43/12; H04L 63/0245; H04L 43/0882
See application file for complete search history.

(56) References Cited

U.S. PATENT DOCUMENTS

| | | | | |
|---|---|---|---|---|
| 8,000,244 | B1 * | 8/2011 | Canion | H04L 47/215 370/235 |
| 8,307,440 | B1 * | 11/2012 | Canion | H04L 63/1416 726/23 |
| 2008/0101396 | A1 * | 5/2008 | Miyata | H04L 12/66 370/408 |
| 2009/0248865 | A1 * | 10/2009 | Kodama | G06F 9/505 709/224 |

(Continued)

*Primary Examiner* — Clemence Han
(74) *Attorney, Agent, or Firm* — Okamoto & Benedicto LLP (57) ABSTRACT

A load distribution for data units received by a particular packet inspection device that is part of a collection of packet inspection devices is determined, where the packet inspection devices in the collection are to examine content of corresponding received data units. For corresponding data units received by the particular packet inspection device, the determined load distribution favors keeping the corresponding data units at the particular packet inspection device. Based on metric information regarding utilization of at least the particular packet inspection device, the load distribution is dynamically modified.

12 Claims, 4 Drawing Sheets

(56) References Cited

U.S. PATENT DOCUMENTS

| | | | |
|---|---|---|---|
| 2011/0228778 A1* | 9/2011 | Dyke | H04L 45/66 370/392 |
| 2012/0047573 A1* | 2/2012 | Duncan | H04L 29/12915 726/13 |
| 2012/0179800 A1* | 7/2012 | Allan | H04L 45/245 709/223 |
| 2013/0201989 A1* | 8/2013 | Hu | H04L 45/24 370/392 |

* cited by examiner

DETERMINING A LOAD DISTRIBUTION FOR DATA UNITS AT A PACKET INSPECTION DEVICE

CROSS-REFERENCE TO RELATED APPLICATION

This application is a continuation of U.S. application Ser. No. 14/428,038, filed on Mar. 13, 2015, now U.S. Pat. No. 9,515,934, which is incorporated herein by reference in its entirety.

BACKGROUND

Packet inspection devices can be deployed in a network to inspect content of data packets communicated through the network. When used to apply network security, packet inspection technology is employed at multiple protocol layers to identify suspicious or malicious packets. In other examples, packet inspection can also be applied in other fields. As the use of networking technology continues to grow, performance of packet inspection devices is scaled to provide the ability to inspect increasing levels of network traffic.

BRIEF DESCRIPTION OF THE DRAWINGS

Some embodiments are described with respect to the following figures.

DETAILED DESCRIPTION

To increase the overall capacity of a system to perform packet inspection of data packets communicated to a network, multiple packet inspection devices can be arranged in a stack. A stack of packet inspection devices can refer to any collection of the packet inspection devices, where the packet inspection devices in the collection are interconnected using interconnection links (e.g. high-speed interconnection links). A stack of packet inspection devices in some examples can refer to a physical stack of such packet inspection devices, where one packet inspection device can be physically placed over another packet inspection device. In other examples, a stack of packet inspection devices does not have to be physically stacked one on top of each other, but rather, can be provided in one or multiple enclosures that allow for interconnection of the packet inspection devices.

In some implementations, each packet inspection device may have the capability to be connected to the network using any suitable network protocol, such as the Ethernet protocol. In alternate implementations, only a subset of the packet inspection devices may be connected to the network.

Packet inspection can involve examining the content of a packet, where the examined content includes the payload of the packet, and possibly the header of the packet. A "packet" can refer to any type of data unit that is used for carrying data between electronic devices. As examples, a packet can include an Internet Protocol (IP) packet, an Ethernet frame, or any other type of data unit.

Examining the content of a packet can be performed for various purposes, including security purposes (e.g. to identify or block unauthorized intrusion, to detect or block malware such as a virus or worm, to detect or block spam, to detect protocol non-compliance, to control an application, and so forth). Packet inspection to detect protocol non-compliance seeks to identify data that does not conform or comply with one or multiple standards. Packet inspection for controlling an application can involve preventing execution or allowing execution of the application, based on one or multiple criteria. Packet inspection can also be performed for other purposes, such as to perform data mining (to analyze content of packets to better understand information that is communicated over a network), eavesdropping (e.g. eavesdropping by a government agency or an enterprise) content, censoring, system monitoring (e.g. to determine what is going on in a system, such as a network), and so forth.

An example type of packet inspection is deep packet inspection (DPI), which examines the content of the packet at multiple protocol layers. Packet inspection performed by a packet inspection is distinguished from inspection of just the header of a packet, which is typically done by switches or routers for the purpose of routing packets to destinations.

To avoid overburdening a particular packet inspection device in the stack in the presence of incoming traffic, a load distribution mechanism or technique can be implemented to allow for some incoming packets to be distributed from one packet inspection device to another packet inspection device in the stack. However, a challenge associated with distribution of packets among packet inspection devices in a stack is that the amount of traffic distributed among the packet inspection devices of the stack can be relatively high. Having to increase the bandwidth of the network connectivity among packet inspection devices of a stack to accommodate a relatively high amount of distributed traffic among packet inspection devices can result in increased costs, in terms of equipment costs and deployment costs.

Another issue relates to flow affinity, which provides that packets of a given traffic flow are to be handled by the same packet inspection device. In some examples, to provide flow affinity, a hash function (or other function) can be applied on certain information in an incoming packet, where the information can include a protocol, a source address, and a destination address. Applying the hash function on specific fields of the packet produces a hash value (or other value) that maps to a corresponding entry of a table, where the entry contains a value that refers to a particular packet inspection device that is to inspect the packet. In some cases, flow affinity can result in a relatively large number of packets being forwarded from an ingress packet inspection device to another packet inspection device, which can lead to increased traffic on interconnect links.

Also, some traffic flows may consume more resources than other traffic flows, so that even distribution of packets of the traffic flows among packet inspection devices may still lead to uneven load on the packet inspection devices. Also, in some cases, a load distribution mechanism or technique may assume that the packet inspection devices of a stack all have the same capacity in processing incoming traffic, which may not be correct.

In accordance with some implementations, techniques or mechanisms are provided to allow for dynamic distribution of incoming packets among packet inspection devices of a stack, where the techniques or mechanisms employ a load distribution strategy that favors keeping a given packet at the ingress packet inspection device that received the given packet. In some implementations, the load distribution strategy can be controlled by a master device in the stack, directing each stack member in how to distribute the traffic. The load distribution strategy that favors keeping packets at ingress packet inspection devices that received the respective packets allows for a reduction in amount of packets that have to be distributed among packet inspection devices of the stack. As a result, the stack of packet inspection devices can be designed and implemented with interconnection links having reduced bandwidth specifications, which can allow the stack to be deployed with a more cost-efficient network connectivity infrastructure and allow the stack to scale better.

In addition, the dynamic distribution of incoming packets at a stack of packet inspection devices can be based on monitored metrics relating to utilization of the packet inspection devices and/or interconnect links of the stack. For example, as utilization of a particular packet inspection device approaches a predefined threshold, additional incoming packets can be redirected from the particular packet inspection device to another packet inspection device of the stack. In this way, the load distribution strategy seeks to keep incoming traffic at ingress packet inspection devices, while also allowing for overflow capacity at other members of the stack to process incoming packets when any of the ingress packet inspection devices have a utilization that approaches the predefined threshold. Other factors can also be considered, as explained further below. In accordance with some implementations, overall total performance of the stack of packet inspection devices can be improved, and any adverse impact of relatively low network connectivity bandwidth among the packet inspection devices on performance can be reduced.

Figure 1:
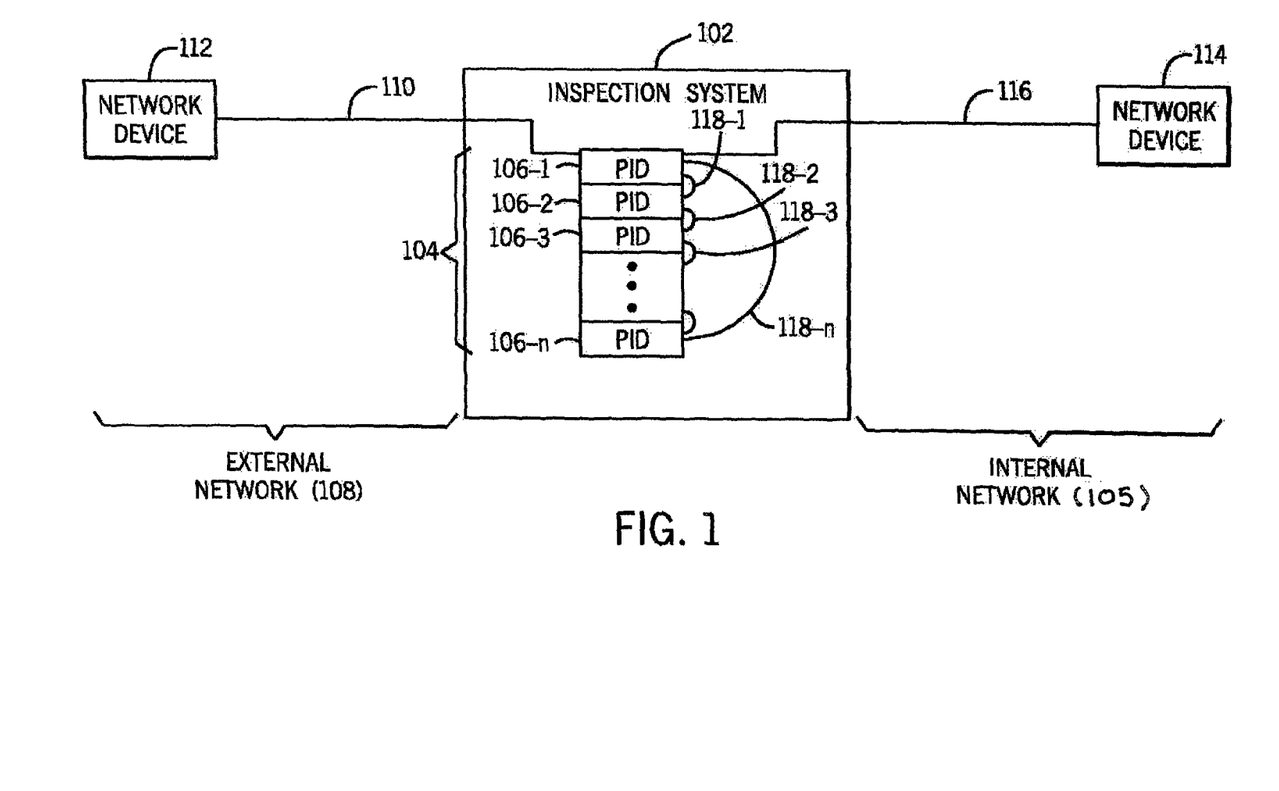
FIG. 1 is a block diagram of an example arrangement that includes packet inspection devices arranged in a stack, in accordance with some implementations.

FIG. 1 is a block diagram of an example arrangement that includes an inspection system 102 that has a stack 104 of packet inspection devices 106-1, 106-2, 106-3, . . . 106-n, where n represents a number of packet inspection devices in the stack 104. In some examples, there can just be two packet inspection devices, such that n is equal to 2, while in other examples, n can be greater than or equal to 3.

The inspection system 102 can be an intrusion prevention system, for example, to protect an internal network 105 from unauthorized access by network devices in an external network 108. The internal network 105 can be an enterprise network, such as a network associated with an enterprise (e.g. business concern, government agency, educational organization, etc.). As another example, the internal network 105 can be a home network of a user. As a further example, the internal network 105 can be a network of an Internet service provider.

The external network 108 that is outside the internal network 105 can include the Internet or some other network.

In other examples, the inspection system 102 can be used for other purposes, such as those discussed further above.

A first side of the inspection system 102 is coupled to a network link 110 of the external network 108. A network device 112 is coupled over the network link 110 to the inspection system 102.

A second side of the inspection system 102 is coupled to a network link 116 of the internal network 105. A network device 114 is coupled over the network link 116 to the inspection system 102. The network link 110 or 116 can be a wired link, a wireless link, or a combination of wired and wireless links. Although just one network link 110 or 116 is depicted in the respective network 108 or 105, it is noted that there can be multiple network links that are connected to the packet inspection devices 106-1 to 106-n of the inspection system 102.

Although just one network device 112 or 114 is depicted in each of the respective networks 108 or 105, it is noted that there can be additional network devices in the respective networks. The (source) network device 112 in the external network 108 is able to send packets targeted to a destination (e.g. network device 114) in the internal network 105. In examples where the inspection system 102 is an intrusion prevention system or is used for censorship, one or multiple ones of the packet inspection devices 106-1 to 106-n are able to examine the incoming packets received from the network link(s) 110 to determine whether or not the packets are allowed to proceed to the internal network 105. In other examples, the inspection system 102 allows packets to freely pass between the external network 108 and the internal network 105, except that the packet inspection devices in such other examples can be used for other purposes such as data mining, eavesdropping, and so forth.

As further depicted in FIG. 1, the packet inspection devices 106-1 to 106-n are interconnected by various interconnect links, including an interconnect link 118-1 between packet inspection devices 106-1 and 106-2, an interconnect link 118-2 between packet inspection devices 106-2 and 106-3, and so forth. An interconnect link 118-n connects the packet inspection device 106-n to packet inspection device 106-1. The connection topology depicted in FIG. 1 is a ring topology, where the packet inspection devices can be considered to be connected in a ring. By using the ring topology, each packet inspection device can be implemented with just two interconnect ports for the purpose of interconnecting the packet inspection devices of the stack 104 with each other. In alternate implementations, each packet inspection device may be directly connected to each of the other PID's, forming a grid of interconnect links (as opposed to a ring topology).

In accordance with some implementations, the inspection system 102 includes a master device that is able to manage the load distribution strategy. The master device can be one of the packet inspection devices 106-1 to 106-n. Alternatively, the master device can be a controller distinct from the packet inspection devices 106-1 to 106-n. In some examples, the master device can be dynamically selected in an election process among the packet inspection devices of the stack 104.

In some implementations, the master device's responsibilities include determining the load distribution of incoming packets among the packet inspection devices of the stack 104 based on various monitored metrics, including a metric relating to performance, a metric relating to headroom (e.g. available capacity of each packet inspection device based on the existing load at the packet inspection device), a metric relating to utilization of the interconnect links (118-1 to 118-n) among the packet inspection devices, and/or other metrics.

Examples of metrics that can be measured by the packet inspection device relating to performance can include one or some combination of the following: a congestion metric to measure an amount of congestion in the packet inspection device, a throughput metric to measure processing speed through the packet inspection device, or another metric. Examples of a metric relating to utilization of an interconnect link can include a consumed bandwidth of the interconnect link, a congestion state (e.g. congested, uncongested, etc.) of the interconnect link, and so forth.

Although some example metrics are listed above, it is noted that in other implementations, other or additional types of metrics can be employed. More generally, metrics that can be used include metrics associated with operation or available processing capacity of the packet inspection device, or metrics associated with operation or state of an interconnect link that is connected to a packet inspection device.

The various metrics can be monitored and collected by the corresponding packet inspection devices. The packet inspection devices can send the monitored metrics to the master device periodically or in response to another event (e.g. fault condition, excessive loading condition, etc.).

Based on the monitored metrics, the master device can determine an appropriate load distribution for each packet inspection device in the stack 104. The monitored metrics allows the master device to determine whether utilization of a packet inspection device and/or of an interconnect link is within predefined thresholds. In some further implementations, a threshold relating to utilization of a packet inspection device can be varied based on utilization of an interconnect link. For example, as the utilization of an interconnect link approaches a certain threshold, then the threshold relating to the utilization of the packet inspection device can be increased to favor keeping received packets at the packet inspection device.

In further implementations, another factor that can be considered by the master device is a factor relating to resource partitioning. For example, a given traffic flow of packets may specify that at least a predefined amount of resources be allocated to the given traffic flow. In this case, the master device can partition the resources such that at least the predefined amount of resources is allocated to the given traffic flow.

The load distribution determined by the master device for each packet inspection device of the stack 104 can be represented in a load distribution data structure, such as a load distribution table that can be stored at a corresponding packet inspection device. According to the load distribution determined by the master device, the master device can update the load distribution tables at the packet inspection devices of the stack 104 to achieve a target distribution of incoming packets to be processed by the stack 104. Note that the load distribution tables in different ones of the packet inspection devices can be different. The master device can individually program the content of the respective load distribution tables.

An ingress packet inspection device (which receives an incoming packet) uses its respective load distribution table to determine where the incoming packet is to be directed (either the incoming packet is processed locally by the ingress packet inspection device, or the incoming packet is distributed over one or multiple interconnect links to another packet inspection device in the stack 104).

In some implementations, the master device can also be responsible for other tasks. For example, the master device can be responsible for managing the addition of a new packet inspection device to the stack 104, or the removal of a packet inspection device from the stack 104. As further examples, the master device can initiate a rebalance process to cause traffic flows to be redirected to a different packet inspection device, as discussed further below in connection with FIG. 4.

Figure 2:
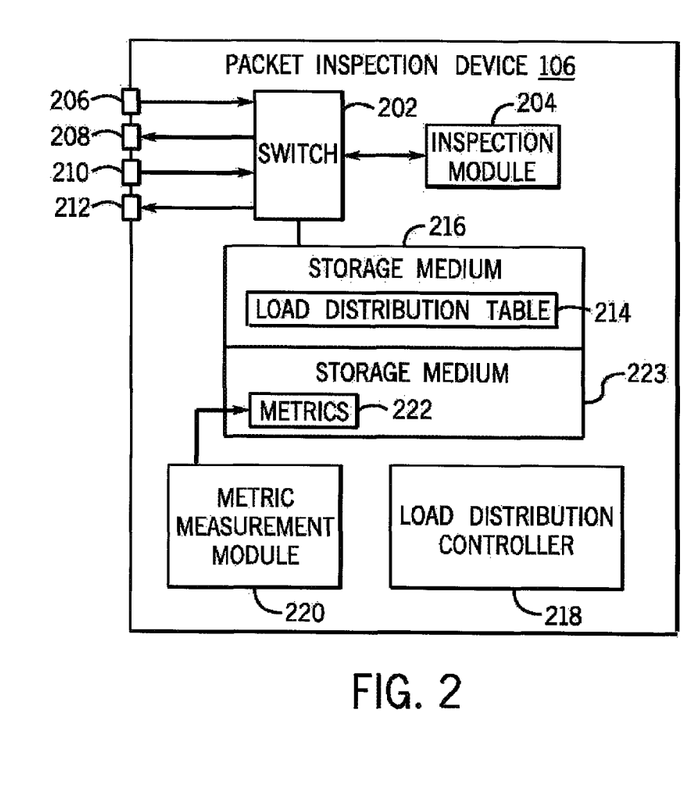
FIG. 2 is a block diagram of an example packet inspection device, in accordance with some implementations.

FIG. 2 illustrates an example packet inspection device 106, which includes a switch 202 and an inspection module 204. The switch 202 or inspection module 204 can be implemented as an integrated circuit, or as machine-readable instructions executable on a processing circuit. The switch 202 receives packets from an ingress network port 206. The ingress network port 206 is connected to a network link, such as network link 110 of the external network 108 in FIG. 1. The packet inspection device 106 also has an egress network port 208, to send a packet to a destination network link, such as 116 in the internal network 105 in FIG. 1. In other examples, instead of providing separate ingress and egress network ports, a bi-directional network port can be used. It is noted that there can be multiple sets of the ingress and egress network ports 206 and 208 in other implementations.

The switch 202 is also connected to an ingress stack port 210 and an egress stack port 212. The ingress stack port 210 is used by the switch 202 to receive a packet from another packet inspection device over an interconnect link, such as one of 118-1 to 118-*n* in FIG. 1. The egress stack port 212 is used by the switch 202 to send a packet to another packet inspection device over a corresponding interconnect link. In other examples, instead of providing separate ingress and egress stack ports, a bi-directional stack port can be used.

In accordance with some implementations, the switch 202 makes its determination of how an incoming packet received through the ingress network port 206 (from the external network 110 of FIG. 1, for example) is to be processed by using a load distribution table 214, which can be stored in a storage medium 216 of the packet inspection device 106. Information in the incoming packet is mapped to an entry of the load distribution table 214. The content of the mapped entry of the load distribution table 214 allows the switch 202 to determine where the incoming packet is to be processed. The information of the incoming packet that is mapped to an entry of the load distribution table 214 can include the following: a protocol (e.g. IP protocol), a source address (e.g. source IP address), and a destination address (e.g. destination IP address). In some examples, a hash function (or other type of function) can be applied on the packet information, and an output value (e.g. hash value or other value) is produced that maps to one of multiple entries of the load distribution table 214. Different output values from the function map to different entries of the load distribution table 214.

In some examples, each entry of the load distribution table 214 has a corresponding destination identifier that corresponds to one of the multiple packet inspection devices of the stack, to which the incoming packet is to be routed. The different packet inspection devices 106-1 to 106-*n* in the stack 104 (FIG. 1) can be associated with respective destination identifiers. In some examples, the destination identifiers can be in the form of port numbers, where different port numbers can correspond to different packet inspection devices. Depending upon the destination identifier contained in the mapped entry of the load distribution table 214, the incoming packet is forwarded to the packet inspection device identified by the respective destination identifier.

In other examples, instead of using a load distribution table 214, other types of load distribution data structures can be employed that contain information to allow the switch 202 to distribute incoming packets to selected ones of packet inspection devices in the stack 104.

If the mapped entry of the load distribution table 214 indicates that the incoming packet (received at the ingress network port 206 of a given packet inspection device 106) is to be examined locally by the given packet inspection device 106, the incoming packet is provided to the inspection module 204 to perform the corresponding examination of the content of the incoming packet. After examination, if the packet satisfies one or multiple criteria that is the subject of the inspection, the inspection module 204 can inform the switch 202 to forward the incoming packet to the egress network port 208 for transmission to a destination network device.

On the other hand, if the mapped entry of the load distribution table 214 indicates that the incoming packet is to be examined by another packet inspection device 106, then the incoming packet is sent through the egress stack port 212 to another packet inspection device.

As further depicted in FIG. 2, the packet inspection device 106 further includes a metric measurement module 220, to measure various metrics as discussed above. The collected metrics can be stored as metrics 222 in a storage medium 223, for communication to the master device. The metric measurement module 220 can be implemented as an integrated circuit or machine-readable instructions executable on a processing circuit.

The packet inspection device 106 also has a load distribution controller 218, which can be implemented as an integrated circuit or machine-readable instructions executable on a processing circuit. If the packet inspection device 106 is the master device, then the load distribution controller 218 performs the tasks of the master device relating to load distribution, as discussed above. If the packet inspection device 106 is a non-master device (also referred to as a "participant device"), then the load distribution controller 218 of the participant device interacts with the load distribution controller 218 of the master device to allow load distribution determinations to be made. For example, the load distribution controller 218 of the participant device can send collected metrics (222) to the master device. Additionally, the load distribution controller 218 of the participant device can receive messaging from the load distribution controller 218 of the master device that relates to updating the load distribution table 214.

The load distribution table 214 of a given packet inspection device 106 can be dynamically updated based on changing conditions in the stack 104. As noted above, the master device monitors metrics associated with respective stack members and/or interconnect links to determine if the master device should change the current load distribution as reflected in the load distribution tables of the packet inspection devices in the stack.

As noted above, the load distribution strategy employed by the master device favors keeping an incoming packet at the ingress packet inspection device such that the incoming packet is inspected at the ingress packet inspection device. Such a strategy can be considered a "greedy load distribution strategy," since the ingress packet inspection device tends to keep the incoming packet for local inspection. Use of such greedy strategy can result in reduced traffic over the stack interconnect links (118-1 to 118-*n* of FIG. 1). In some implementations, the greedy load distribution strategy can be provided by programming a larger number of entries in the load distribution table of a local packet inspection device to include the destination identifier of the local packet inspection device.

In some implementations, the master device also seeks to optimize load distribution while making a minimum number of changes to the load distribution table 214 of a packet distribution device. This approach of optimizing load distribution while reducing the number of times that a load distribution table 214 is changed allows the load distribution to be "sticky." However, if certain conditions are detected, such as an emergency condition or a fault condition, a specified constraint on the number of changes that can be made to a load distribution table 214 can be disregarded.

In some examples, a particular packet inspection device can request that traffic be re-directed to the particular packet inspection device, but does not autonomously decide to direct its traffic to another packet inspection device.

In some examples, a given packet can be re-distributed just once. In other words, a particular packet inspection device should attempt to process the packet that was load-balanced (distributed) to the particular packet inspection device from another packet inspection device. The particular packet inspection device should not redirect the packet to another packet inspection device.

Figure 3:
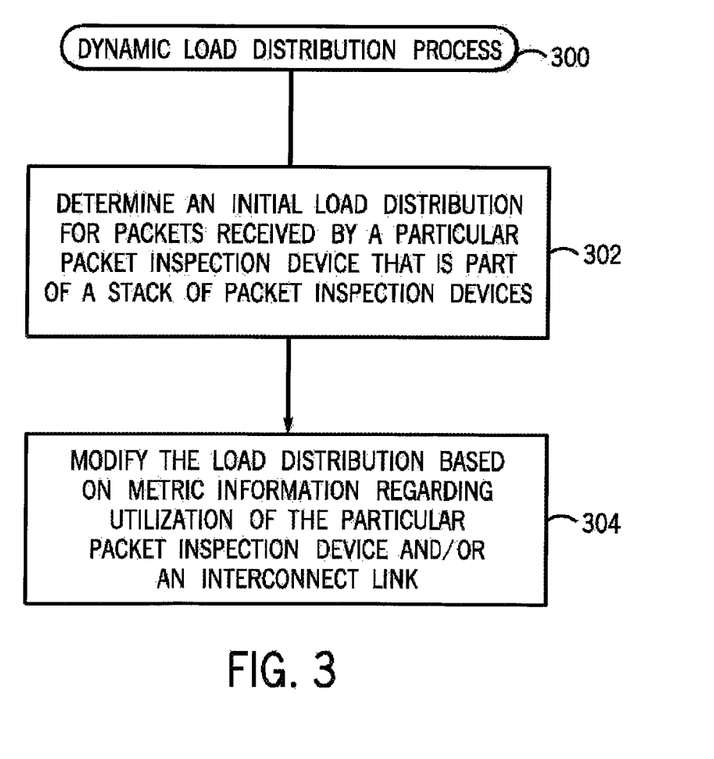
FIG. 3 is a flow diagram of a dynamic load distribution process according to some implementations.

FIG. 3 is a flow diagram of a dynamic load distribution process 300 according to some implementations. The dynamic load distribution process 300 of FIG. 3 can be performed by the master device, which can be one of the packet inspection devices 106. More specifically, the dynamic load distribution process 300 can be performed by the load distribution controller 218 (FIG. 2) in the master device, in accordance with some examples.

The master device determines (at 302) an initial load distribution for packets received by a particular packet inspection device 106 that is part of a stack of packet inspection devices. The master device programs the load distribution table 214 of the particular packet inspection device to reflect this initial load distribution. As noted above, the initial load distribution favors keeping incoming packets received by the particular packet inspection device at the particular packet inspection device for inspection by its inspection module 204.

At a later time, the master device is able to dynamically modify (at 304) the load distribution (by modifying the content of the load distribution table 214 in the particular packet inspection device), based on metric information regarding utilization of at least the particular packet inspection device and/or the interconnect link(s). The modification of the load distribution table 214 of the particular packet inspection device can be in response to some predefined event. For example, if metrics received from one or multiple ones of the packet inspection devices indicate that a specific packet inspection device has reached a state where congestion is imminent or occurring (utilization of the specific packet inspection device has fallen outside predefined specifications), the master device can take action to rebalance the load, which can be accomplished by updating respective load distribution table(s) 214 in the respective packet inspection device(s). Similarly, if a metric indicates that utilization of a specific interconnect link has fallen outside a predefined threshold (based on measurement notifications from participant devices), the master device can also take action to re-distribute the load.

Figure 4:
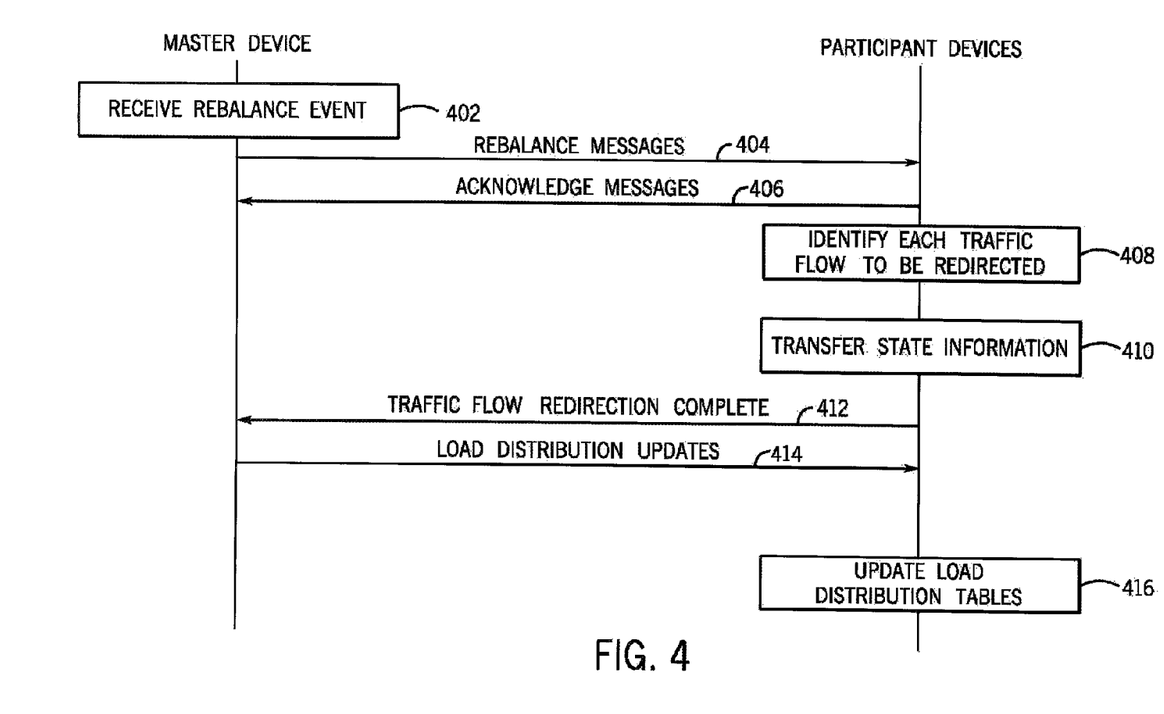
FIG. 4 is a flow diagram of a rebalance process according to some implementations.

FIG. 4 is a flow diagram of a rebalance process according to some implementations. The rebalance process is performed in response to a rebalance event, which can be any of various types of events. In some examples, rebalance events can include a housekeeping event, an emergency event, and a user-requested event. The rebalance process can be performed by the master device and one or multiple participant devices, and more specifically, by the load distribution controllers 218 in the master and participant devices.

A housekeeping event can include a timer event. The timer event is triggered upon expiration of a timer. Repeated expirations of the timer correspond to periodic occurrences of the timer event. Another housekeeping event relates to an event that is triggered when a utilization of a packet inspection device or of an interconnect link has or is reaching a certain level (e.g. a packet inspection device or an interconnect link being excessively loaded).

An emergency event relates to a condition that is considered to be so severe that quick action should be performed. Examples of an emergency event include an event triggered in response to detected failure or other fault of a packet inspection device or an interconnect link.

A user-requested event is triggered by a user, such as an administrator. The user can use a user interface to request that rebalancing of load of a stack of packet inspection devices is to be performed.

The master device receives (at 402) a rebalance event. In response to this rebalance event, the master device issues (at 404) rebalance messages to participant devices in the stack that are to redirect their traffic to another packet inspection device. In response to the rebalance messages, the participant devices acknowledge receipt of the rebalance messages by returning (at 406) acknowledgment messages to the master device.

Each participant device then initiates the process of redirecting related traffic flows to the target packet inspection device(s). A "traffic flow" can include one or multiple packets that are associated with a particular communication between at least a pair of network devices. The traffic flow redirection can be accomplished by each participant device identifying (at 408) each traffic flow that is to be redirected. Each participant device then transfers (at 410) state information of each identified traffic flow to a corresponding target packet inspection device (to which the identified traffic flow is to be redirected). The state information can include identification information and other information relating to the redirected traffic flow. The state information can also specify an action to be taken with respect to the redirected traffic flow (e.g. block traffic flow, reduce a rate of the traffic flow, or trust the traffic flow). In some examples, transfer of the state information allows the target packet inspection device to be aware that an attack or other event is occurring, such that the target packet inspection device can take the appropriate action after a traffic flow has been redirected. After each traffic flow has been identified and the corresponding state information has been transferred to the target packet inspection device(s), the respective participant device can notify (at 412) the master device that the corresponding traffic flow redirection has been completed.

In response, the master device can issue (at 414) load distribution table updates to the participant devices that have notified the master device that flow redirection has been completed. This causes the corresponding load distribution tables 214 in the corresponding participant devices to be updated (at 416).

Updating of the load distribution tables 214 will cause each corresponding packet inspection device to automatically forward appropriate incoming packets to the respective target packet inspection devices.

The foregoing has indicated that various modules can be implemented as machine-readable instructions in some examples. These machine-readable instructions are loaded for execution on a processing circuit. A processing circuit can include a microprocessor, microcontroller, processor module or subsystem, programmable integrated circuit, programmable gate array, another control or computing device, or multiple ones of any of the foregoing.

Data and instructions are stored in respective storage devices, which are implemented as one or multiple non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:

determining, by a controller, a load distribution for data units received by a particular packet inspection device that is part of a collection of packet inspection devices, where the packet inspection devices in the collection of packet inspection devices are to examine content of corresponding received data units, and where, for corresponding data units received by the particular packet inspection device, the determined load distribution favors keeping the corresponding data units at the particular packet inspection device;

maintaining in each packet inspection device in the collection of packet inspection devices a load distribution data structure that represents the load distribution;

based on metric information regarding utilization of at least the particular packet inspection device, dynamically modifying, by the controller, the load distribution;

updating the load distribution data structure in each packet inspection device in the collection of the packet inspection devices to reflect the dynamically modified load distribution;

receiving an incoming data unit in a first packet inspection device in the collection of packet inspection devices;

determining, by the first packet inspection device, that the incoming data unit is not to be processed in the first packet inspection device in accordance with the load distribution data structure maintained in the first packet inspection device; and in accordance with the load distribution data structure maintained in the first packet inspection device, forwarding the incoming data unit from the first packet inspection device to a second packet inspection device in the collection of packet inspection devices and not processing the incoming data unit in the first packet inspection device.

2. The method of claim 1, further comprising:
each of the packet inspection devices examining the content of respective data units.

3. The method of claim 1, wherein the load distribution data structure has a plurality of entries, where each of the entries contains a destination identifier corresponding to one of the packet inspection devices.

4. The method of claim 3, further comprising: receiving, by the particular packet inspection device, an incoming data unit;
mapping, by the particular packet inspection device, the incoming data unit to a given entry of the load distribution data structure; and
directing the incoming data unit to a packet inspection device specified by the destination identifier in the given entry.

5. The method of claim 4, wherein the mapping includes applying a function to an address of the incoming data unit to produce an output value that maps to the given entry.

6. The method of claim 1, wherein the modifying is in response to an event indicating that data units should be redirected from the particular packet inspection device to another packet inspection device.

7. The method of claim 1, further comprising:
receiving, by the controller, the metric information from the packet inspection devices of the collection of packet inspection devices, where the metric information is selected from among a metric relating to performance of a packet inspection device, a metric relating to available capacity of a packet inspection device, and a metric relating to utilization of an interconnect link between packet inspection devices.

8. The method of claim 1, further comprising:
receiving the incoming data unit in the second packet inspection device; and
processing the incoming data unit in the second packet inspection device in accordance with the load distribution data structure maintained in the second packet inspection device.

9. The method of claim 8, further comprising:
after processing the incoming data unit in the second packet inspection device, forwarding the incoming data unit to a destination data link and not forwarding the incoming data unit to another packet inspection device in the collection of packet inspection devices.

10. A system comprising:
a stack of packet inspection devices that are interconnected with respect to each other by interconnect links, wherein the packet inspection devices in the stack are to examine content of corresponding received data units and each including a load distribution table that represents a load distribution, wherein the packet inspection devices of the stack are to select a master from among the packet inspection devices, and wherein the master is to:
determine the load distribution for incoming data units received by a particular packet inspection device of the stack, where the determined load distribution favors keeping the incoming data units at the particular packet inspection device;
based on metric information regarding utilization of at least the particular packet inspection device, dynamically modify the load distribution; and
inform packet inspection devices in the stack to update corresponding load distribution tables maintained in the packet inspection devices to reflect the dynamically modified load distribution,
wherein a first packet inspection device in the stack is configured to receive in an ingress stack port a target data unit from a second inspection device in the stack, to determine whether to process the target data unit in the first packet inspection device based on the load distribution table maintained in the first packet inspection device, to forward the target data unit to a destination link by way of an egress network port of the first packet inspection device when the target data unit is processed in the first packet inspection device in accordance with the load distribution table maintained in the first packet inspection device, and to forward the target data unit to a third packet inspection device in the stack by way of an egress stack port of the first packet inspection device when the target data unit is not processed in the first packet inspection device in accordance with the load distribution table maintained in the first packet inspection device.

11. The system of claim 10, wherein the third packet inspection device is configured to receive the target data unit in an ingress stack port of the third packet inspection device from the egress stack port of the first packet inspection device when the target data unit is not processed in the first packet inspection device, and to process the target data unit in the third packet inspection device in accordance with the load distribution table maintained in the third packet inspection device.

12. The system of claim 11, wherein the third packet inspection device is configured to output the target data unit in an egress network port of the third packet inspection device after processing the target data unit in the third packet inspection device, and wherein no other packet inspection device in the stack processes the target data unit after the target data unit is processed in the third packet inspection device.

* * * * *